March 19, 1929.  F. KOCH  1,706,358
PASSAGEWAY DRIVE MECHANISM FOR ARTICULATED CAR UNITS
Filed April 18, 1928  4 Sheets-Sheet 1

INVENTOR
Felix Koch,
by G. D. Laube, atty.

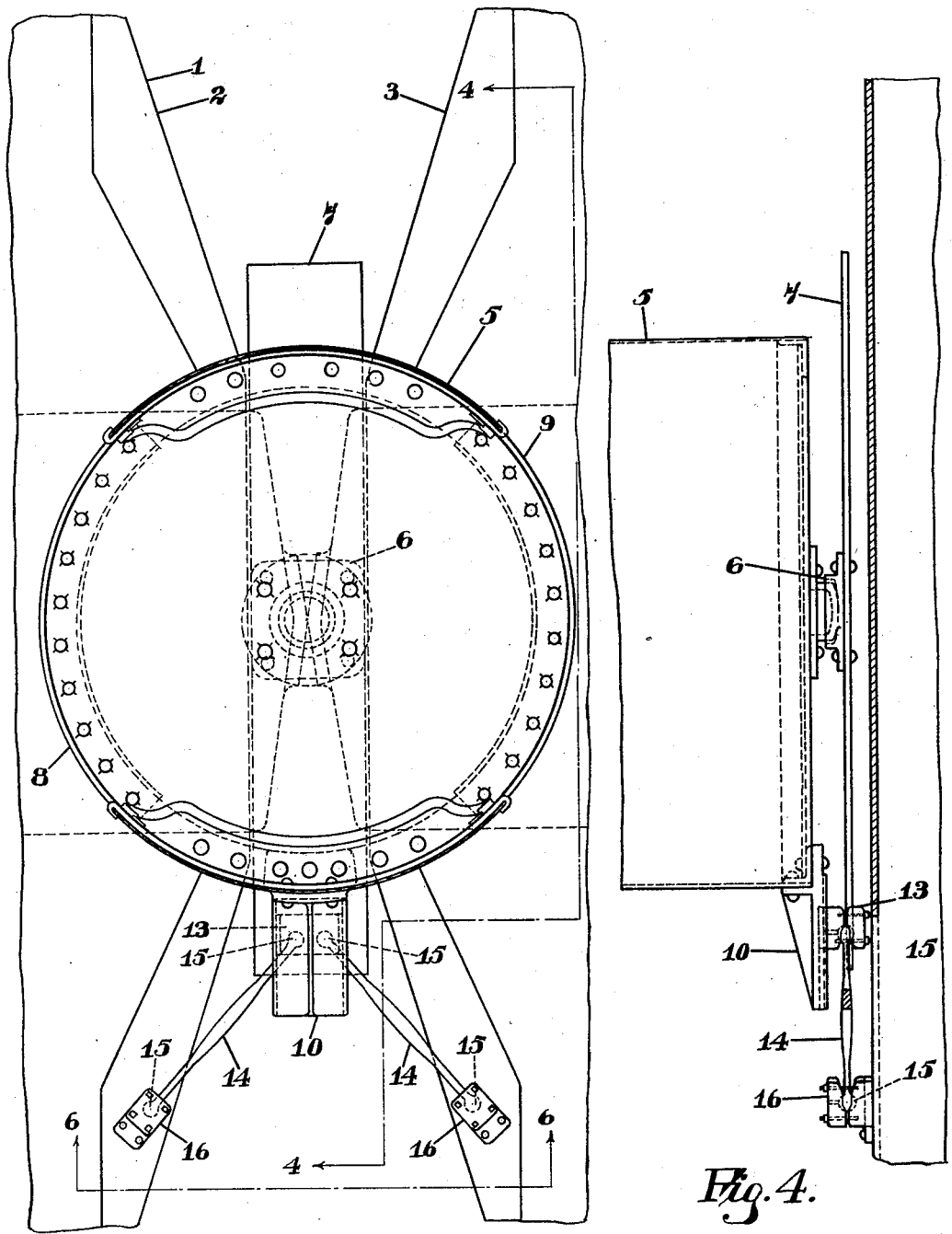

March 19, 1929.  F. KOCH  1,706,358
PASSAGEWAY DRIVE MECHANISM FOR ARTICULATED CAR UNITS
Filed April 18, 1928    4 Sheets-Sheet 3
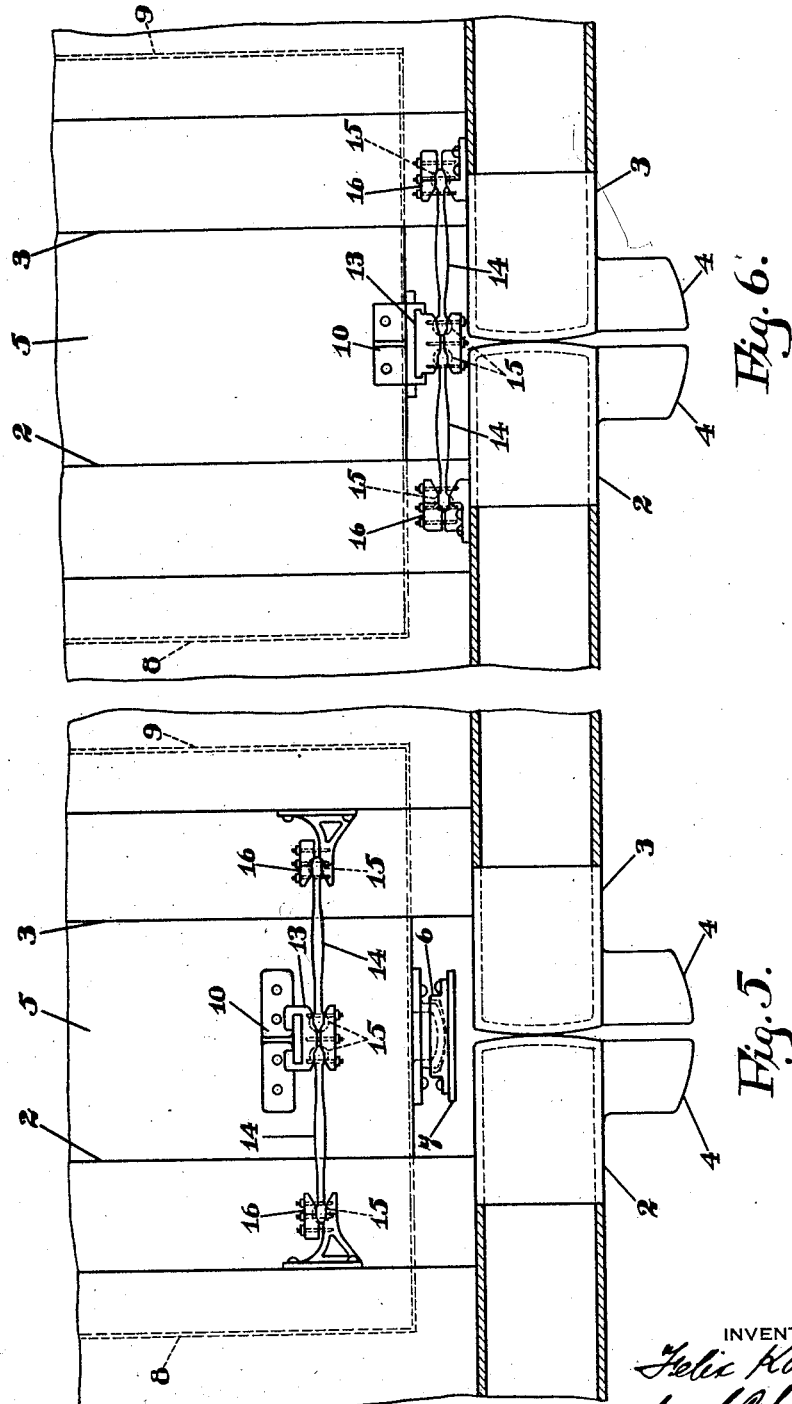
INVENTOR
Felix Koch,
by G. C. Lamber
Atty.

March 19, 1929. F. KOCH 1,706,358
PASSAGEWAY DRIVE MECHANISM FOR ARTICULATED CAR UNITS
Filed April 18, 1928 4 Sheets-Sheet 4

INVENTOR
Felix Koch,
by G. C. Lambe
Atty.

Patented Mar. 19, 1929.

1,706,358

UNITED STATES PATENT OFFICE.

FELIX KOCH, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

PASSAGEWAY DRIVE MECHANISM FOR ARTICULATED CAR UNITS.

Application filed April 18, 1928. Serial No. 270,960.

An object of my invention is to provide the passageway member of an articulated car unit with means operable by the adjacent car bodies for turning the passageway member as the car bodies move relative to each other.

Another object of my invention is to provide an articulated car unit with a passageway drive mechanism mounted on the adjacent car bodies and having a sliding contact with a member on the side of the passageway member.

Another object of my invention is to provide an articulated car unit with a passageway drive mechanism which will be operable by the movement of the car bodies relative to each other, and which will so position the passageway member so as to maintain a free and uninterrupted passage between the car bodies.

Figures 1, 2:
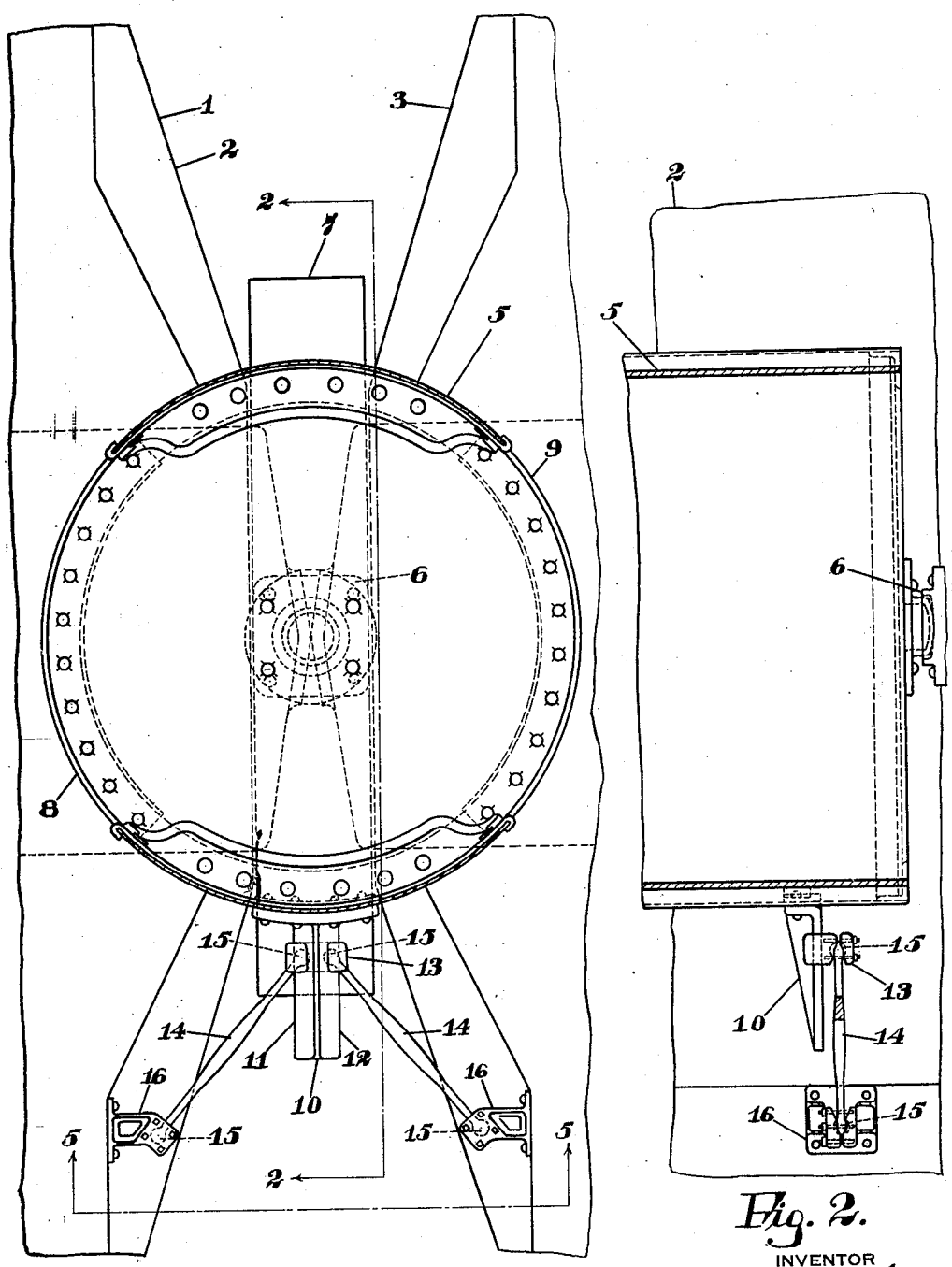
Figure 7:
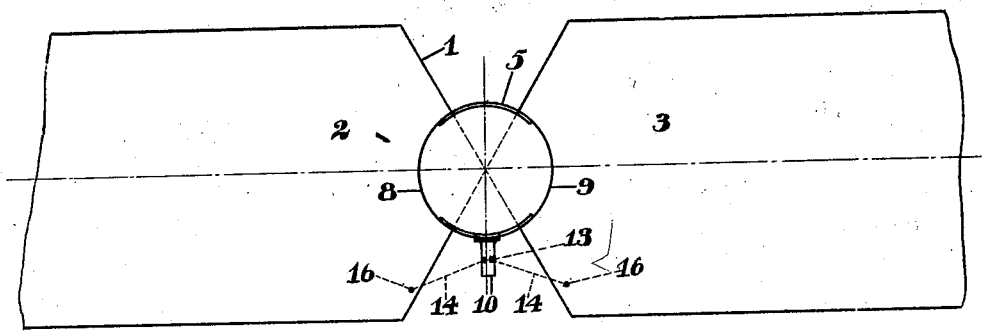
Figure 8:
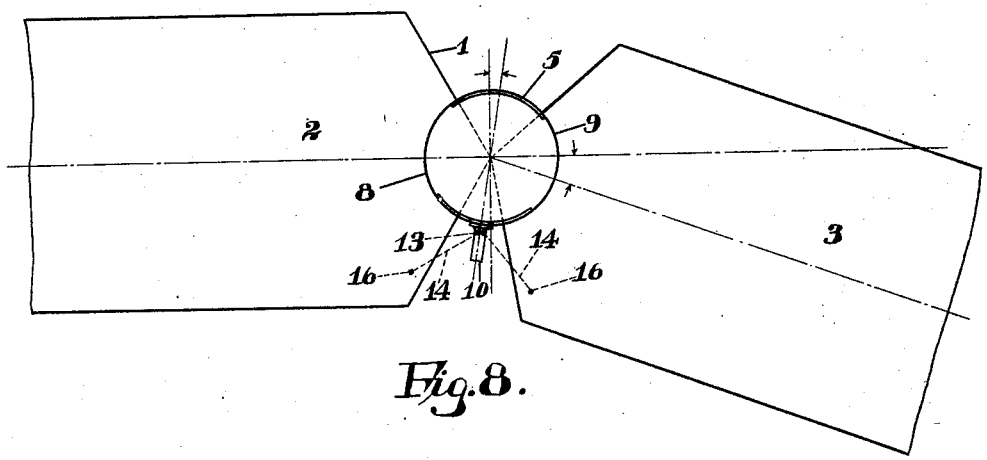
Figure 9:
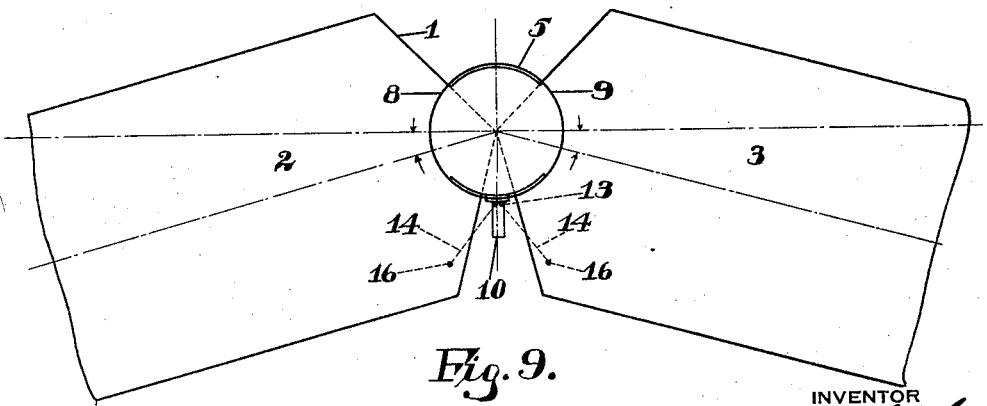

Referring to the drawings, Fig. 1 is a sectional plan view of a portion of an articulated car unit showing the relation of the passageway member to the adjacent car body and the passageway drive mechanism; Fig. 2 is a section taken along the lines 2—2 of Fig. 1 with one body removed; Fig. 3 is a plan view similar to Fig. 1 and shows a modification of my invention; Fig. 4 is a section taken along the lines 4—4 of Fig. 3 with the upper portions of the car bodies removed to better show the invention; Fig. 5 is a section taken along the lines 5—5 of Fig. 1; Fig. 6 is a section taken along the lines 6—6 of Fig. 3; Figs. 7, 8 and 9 show by diagram means the action of the passageway member and drive mechanism when the bodies are on a straight track, when one of the bodies is turning relative to the other, and when both bodies are turning.

Referring now in detail to the drawings where like reference characters refer to like parts, reference character 1 indicates an articulated car unit comprising bodies 2 and 3 supported by means of bearings 4 on a common truck (not shown). A passageway member 5, between and extending into the bodies 2 and 3, is pivotally supported in a bearing 6 secured to a bridge member 7 which is contained on the aforementioned common truck. The details of the pivotal bearing, bridge member and means of supporting same on the common truck are not shown, but it is to be understood that any suitable design of these members will suffice. The passageway member is of the hollow cylinder design, for example, as shown and described in U. S. Pat. No. 1,644,394 granted October 4, 1927, to A. K. Pehrson et al., and has openings 8 and 9 at opposite sides thereof communicating with the adjacent car bodies 2 and 3.

At the side of the passageway member, as shown in Figs. 1, 2 and 5, is a guide member 10 having guide portions 11 and 12 which are slidably engaged by the member 13 attached to the drive mechanism arms 14. These arms 14 comprise an intermediate portion and end portions formed as heads 15. One of the heads 15 is held in suitable depressions in the member 13 to form a ball and socket joint and the other head of the member 14 is held in similar depressions in the member 16 secured to the adjacent vertical portions of the car bodies 2 and 3.

When both bodies are on a straight portion of the track the car bodies 2 and 3, passageway member 5 and passageway drive mechanism are in a position as shown by Figs. 1, 2, 5 and diagram Fig. 7. In this position the arms 14 cooperate with the passageway and adjacent car bodies to maintain the passageway openings 8 and 9 of the passageway member in fixed relation to the openings of the car bodies so as to maintain a free and uninterrupted passageway between the car bodies at all times.

When the articulated car unit is entering a curve in the track and one of the bodies such as 3 has already entered upon the curve while the other body 2 remains on a straight portion of the track, the car bodies will assume a position in relation to each other as shown by the diagram Fig. 8. With the turning of the car body 3 the heads 15 of the arms 14 turning in the sockets of the members 16 push the member 13 along the member 10 attached to the passageway member causing the passageway member 5 to turn on its base 6 a distance proportionate to the angle through which the body 3 is turning. The amount the passageway member turns, in proportion to the angle through which the body 3 turns, is roughly one-half. This movement of the passageway causes the openings 8 and 9 therein to proportion the movement of the opening in the one car body 3 between the two car bodies and maintains a free and uninterrupted passageway between them.

When both car bodies 2 and 3 move relative to each other, as shown by diagram Fig. 9, the arms 14 move the slide 13 along the member 10 to again move the passageway member so as to proportion the movement between the two car bodies. If, as shown in Fig. 9, both bodies move an equal amount the passageway member will of course remain stationary relative thereto, but it will be readily apparent that a greater movement by one body than by the other will cause a proportionate turning of the passageway member.

Figs. 3, 4 and 6 show a modification of my invention with the member 10 secured to the base of the passageway member and the members 16 secured to the underframe of the car body. The movement of the drive mechanism and passageway member will obviously be the same as previously described.

Having thus described the invention what I claim as new and desire to secure by Letters Patent is:

1. In an articulated car unit, a passageway member, a passageway drive mechanism, said mechanism comprising a member mounted in a ball and socket joint on each one of the adjacent ends of the car bodies and similarly engaging a member slidably mounted on the passageway member.

2. In an articulated car unit, a passageway member, a passageway drive mechanism, said mechanism comprising a member attached by a ball and socket joint to the underframe of each of the adjacent car bodies and similarly attached to a member slidably mounted at the base of the passageway member.

3. In an articulated car unit, a passageway member rotatably mounted between and extending into the two adjacent car bodies, a passageway drive mechanism, said mechanism comprising members mounted on the car bodies, and slidably engaging a member secured to the side of the passageway member.

4. In an articulated car unit, adjacent ends of two adjacent car bodies supported on a common truck, a passageway member pivotally mounted on said truck, between and extending into said car bodies, a drive mechanism operable by said bodies controlling the turning of said passageway member, said mechanism comprising an arm on each of the two car bodies engaging a member slidably mounted in guides at the side of the passageway member, the ends of each of said arms forming ball and socket joints at their points of connection.

5. In an articulated car unit, a hollow cylindrical member with openings at each side thereof pivotally mounted on the truck common to both bodies for maintaining an uninterrupted passageway between the car bodies, a drive mechanism for said passageway member comprising members mounted at one end in a ball and socket joint on each one of the two adjacent ends of the car bodies and with the other ends of said members engaged by a member at the side of the passageway member and movable transversely thereof.

In testimony whereof I affix my signature.

FELIX KOCH.